(12) United States Patent
Goto et al.

(10) Patent No.: US 12,734,585 B2
(45) Date of Patent: Sep. 15, 2026

(54) CUTTING INSERT, CUTTING TOOL, AND METHOD FOR MANUFACTURING MACHINED PRODUCT

(71) Applicant: KYOCERA CORPORATION, Kyoto (JP)

(72) Inventors: Shosei Goto, Kyoto (JP); Takuya Ishida, Kyoto (JP)

(73) Assignee: KYOCERA CORPORATION, Kyoto (JP)

( * ) Notice: Subject to any disclaimer, the term of this patent is extended or adjusted under 35 U.S.C. 154(b) by 580 days.

(21) Appl. No.: 18/254,862

(22) PCT Filed: Dec. 3, 2021

(86) PCT No.: PCT/JP2021/044407
§ 371 (c)(1),
(2) Date: May 29, 2023

(87) PCT Pub. No.: WO2022/118946
PCT Pub. Date: Jun. 9, 2022

(65) Prior Publication Data

US 2023/0415239 A1 Dec. 28, 2023

(30) Foreign Application Priority Data

Dec. 4, 2020 (JP) ................................ 2020-202254

(51) Int. Cl.
*B23B 27/16* (2006.01)

(52) U.S. Cl.
CPC ...... *B23B 27/1607* (2013.01); *B23B 27/1611* (2013.01); *B23B 2200/0447* (2013.01); *B23B 2200/321* (2013.01)

(58) Field of Classification Search
CPC ... B23B 27/04; B23B 27/045; B23B 27/1622; B23B 27/1611; B23B 27/1603;
(Continued)

(56) References Cited

U.S. PATENT DOCUMENTS 4,084,917 A * 4/1978 Stumpp ................ B23B 27/145 407/114
4,632,608 A * 12/1986 Blomberg ............ B23B 27/145 407/115
(Continued)

FOREIGN PATENT DOCUMENTS

DE 4437689 A1 * 4/1996 ......... B23B 27/1622
JP 2000190107 A 7/2000
(Continued)

*Primary Examiner* — Nicole N Ramos
(74) *Attorney, Agent, or Firm* — HAUPTMAN HAM, LLP

(57) ABSTRACT

An insert includes an upper surface, a lower surface, lateral surfaces, a cutting edge, and a through hole. The upper surface includes a first corner having a protruding curve shape and a first side and a second side extending from the first corner. A first region of a first lateral surface has a recessed shape recessed toward an axis. The upper surface further includes a recessed portion that is located between the second side and the axis and is recessed toward the axis. An entirety of the recessed portion is located farther from the first corner than an entirety of the first region in a direction along the axis.

10 Claims, 19 Drawing Sheets

(58) Field of Classification Search

CPC ... B23B 27/16; B23B 27/164; B23B 27/1614; B23B 27/1618; B23B 2200/121; B23B 2200/123; B23B 2200/125; B23B 2200/126; B23B 2200/128; B23B 2200/165; B23C 2200/12; B23C 2200/123; B23C 2200/125; B23C 2200/126; B23C 2200/128; B23C 2200/121; B23C 2200/161

See application file for complete search history.

(56) References Cited

U.S. PATENT DOCUMENTS

| | | | | |
|---|---|---|---|---|
| 8,491,231 | B2 * | 7/2013 | Edler | B23B 27/1622 407/103 |
| 2005/0019112 | A1 | 1/2005 | Erickson et al. | |
| 2008/0292415 | A1 | 11/2008 | Kuroda et al. | |

FOREIGN PATENT DOCUMENTS

| | | | |
|---|---|---|---|
| JP | 2005040942 | A | 2/2005 |
| JP | 2006035390 | A | 2/2006 |
| JP | 2007075932 | A | 3/2007 |
| JP | 4797526 | B2 * | 10/2011 |
| JP | 2016203368 | A | 12/2016 |
| WO | 2007039944 | A1 | 4/2007 |
| WO | 2020179538 | A1 | 9/2020 |

* cited by examiner

CUTTING INSERT, CUTTING TOOL, AND METHOD FOR MANUFACTURING MACHINED PRODUCT

CROSS-REFERENCE TO RELATED APPLICATIONS

This application is a national stage entry according to 35 U.S.C. 371 of PCT Application No. PCT/JP2021/044407 filed on Dec. 3, 2021, which claims priority to Japanese Patent Application No. 2020-202254, filed on Dec. 4, 2020.

TECHNICAL FIELD

The present disclosure relates to a cutting insert used in machining for a workpiece, a cutting tool, and a method for manufacturing a machined product.

BACKGROUND OF INVENTION

For example, cutting tools described in Patent Documents 1 to 3 are known as cutting tools to be used for machining workpieces such as those made of metal. The cutting tools described in Patent Documents 1 and 2 have a shape in which a front end portion protruding toward a workpiece is formed to be thinner than other portions. In the cutting tool described in Patent Document 3, a cutting insert is fixed to a holder using a plurality of screws.

CITATION LIST

Patent Literature

Patent Document 1: JP 2000-190107 A
Patent Document 2: JP 2005-040942 A
Patent Document 3: JP 2006-035390 A

SUMMARY

A cutting insert of a non-limiting example in the present disclosure includes an upper surface, a lower surface, lateral surfaces, a cutting edge, and a through hole. The upper surface includes a first corner having a protruding curve shape and a first side and a second side extending from the first corner. The lower surface is located on an opposite side to the upper surface. The lateral surfaces are located between the upper surface and the lower surface. The cutting edge is located on the first corner and the first side. The through hole opens in the upper surface and the lower surface. The lateral surfaces include a first lateral surface extending from the first side to the lower surface, and a second lateral surface extending from the second side to the lower surface. In a front view of the upper surface, a virtual straight line passing through a front end of the first corner and extending in a major axis direction of the upper surface is referred to as an axis. The first lateral surface includes a first region and a second region. The first region extends from the first side to the lower surface and has a recessed shape recessed toward the axis. The second region is flat and is located farther from the first corner than the first region. The upper surface further includes a recessed portion. The recessed portion is located between the second side and the axis and is recessed toward the axis in a front view of the upper surface. An entirety of the recessed portion is located farther from the first corner than an entirety of the first region in a direction along the axis.

DESCRIPTION OF EMBODIMENTS

Figure 1:
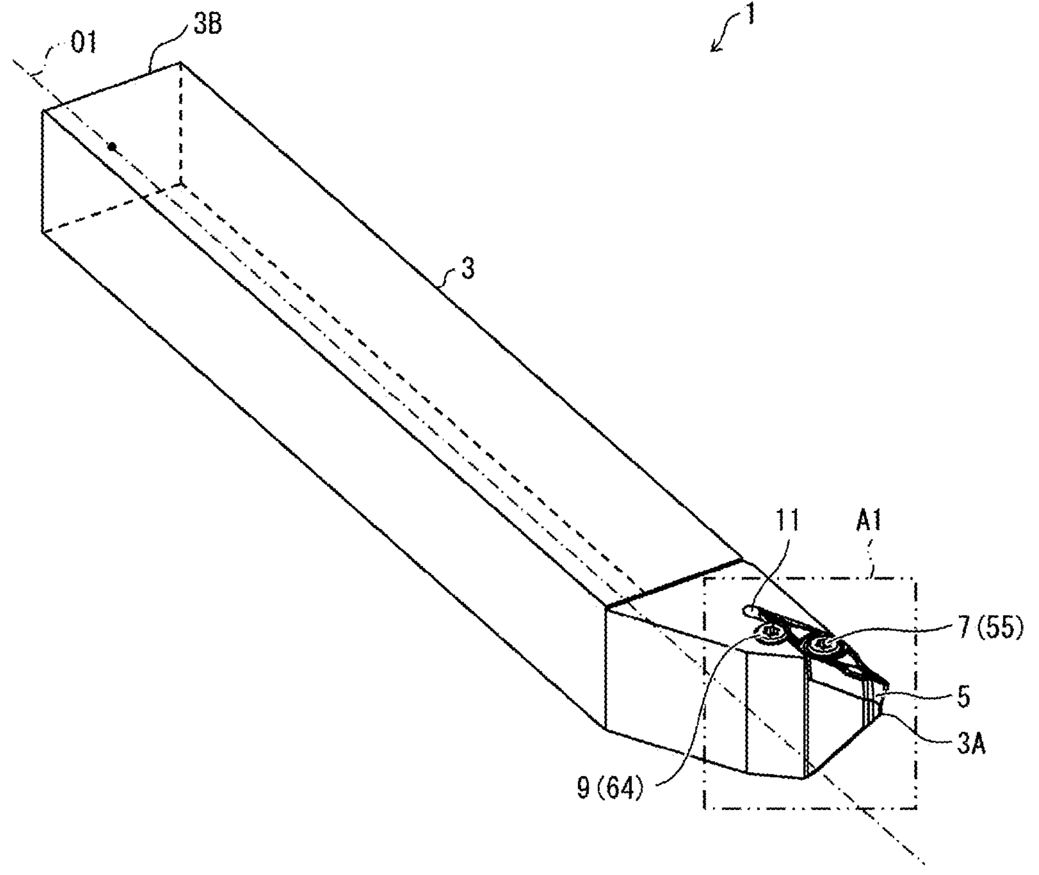
FIG. 1 is a perspective view illustrating a cutting tool of a non-limiting embodiment of the present disclosure.

Detailed description will be given below of a cutting insert (hereinafter, also simply referred to as an insert), a cutting tool, and a method for manufacturing a machined product of a non-limiting embodiment of the present disclosure with reference to the diagrams. However, for convenience of explanation, each of the drawings referenced below is simplified to illustrate only the main members necessary to describe the embodiment. Accordingly, the insert and the cutting tool may be provided with any constituent member that is not illustrated in each of the drawings referenced in this specification. The dimensions of the members in the drawings do not faithfully represent the actual dimensions of the constituent members, the dimension ratios of the members, or the like.

1. Overview of Cutting Tool

Figure 2:
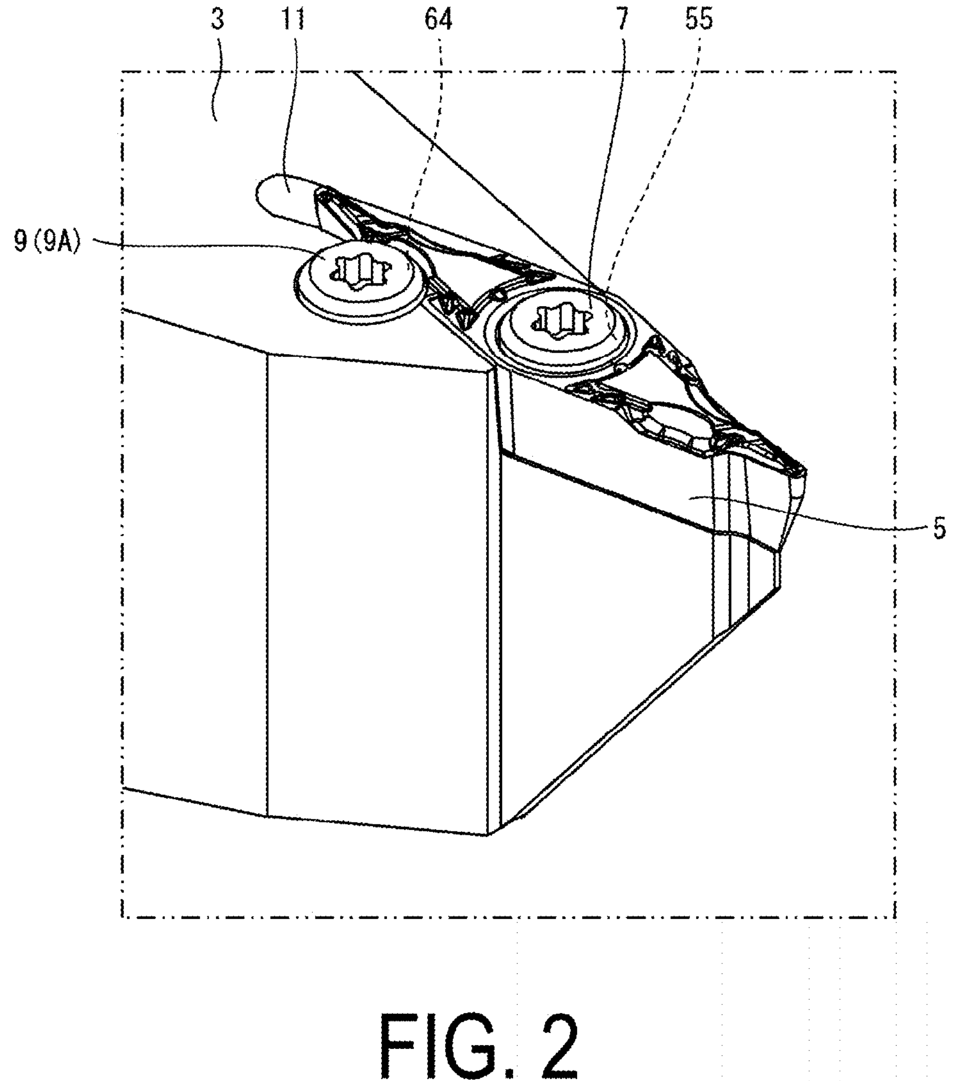
FIG. 2 is an enlarged view of a region A1 illustrated in FIG. 1.
Figure 3:
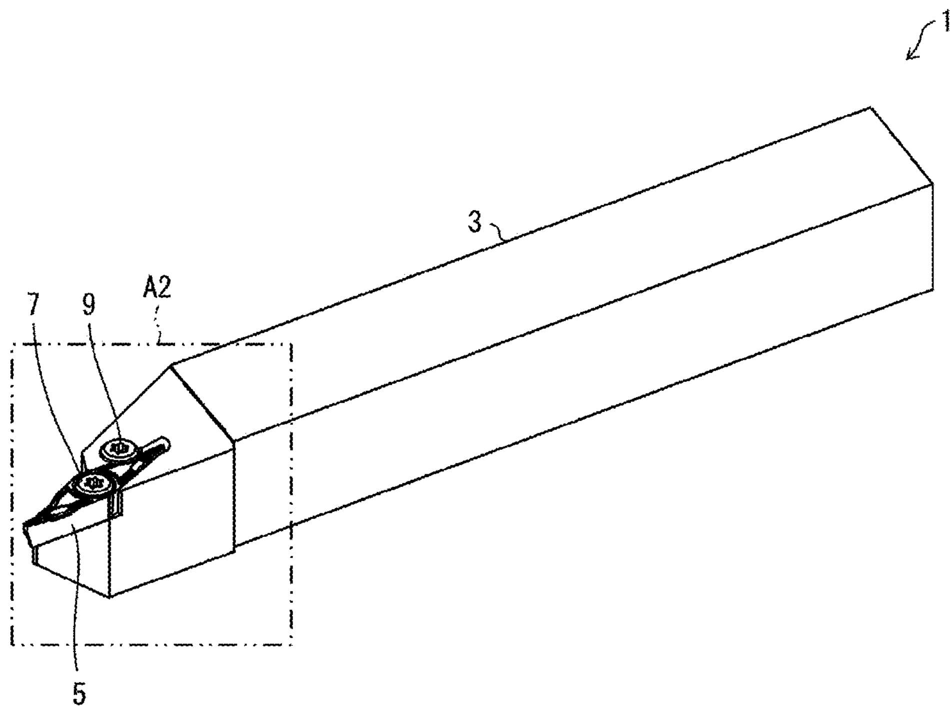
FIG. 3 is a perspective view of the cutting tool illustrated in FIG. 1 viewed at a different angle.
Figure 4:
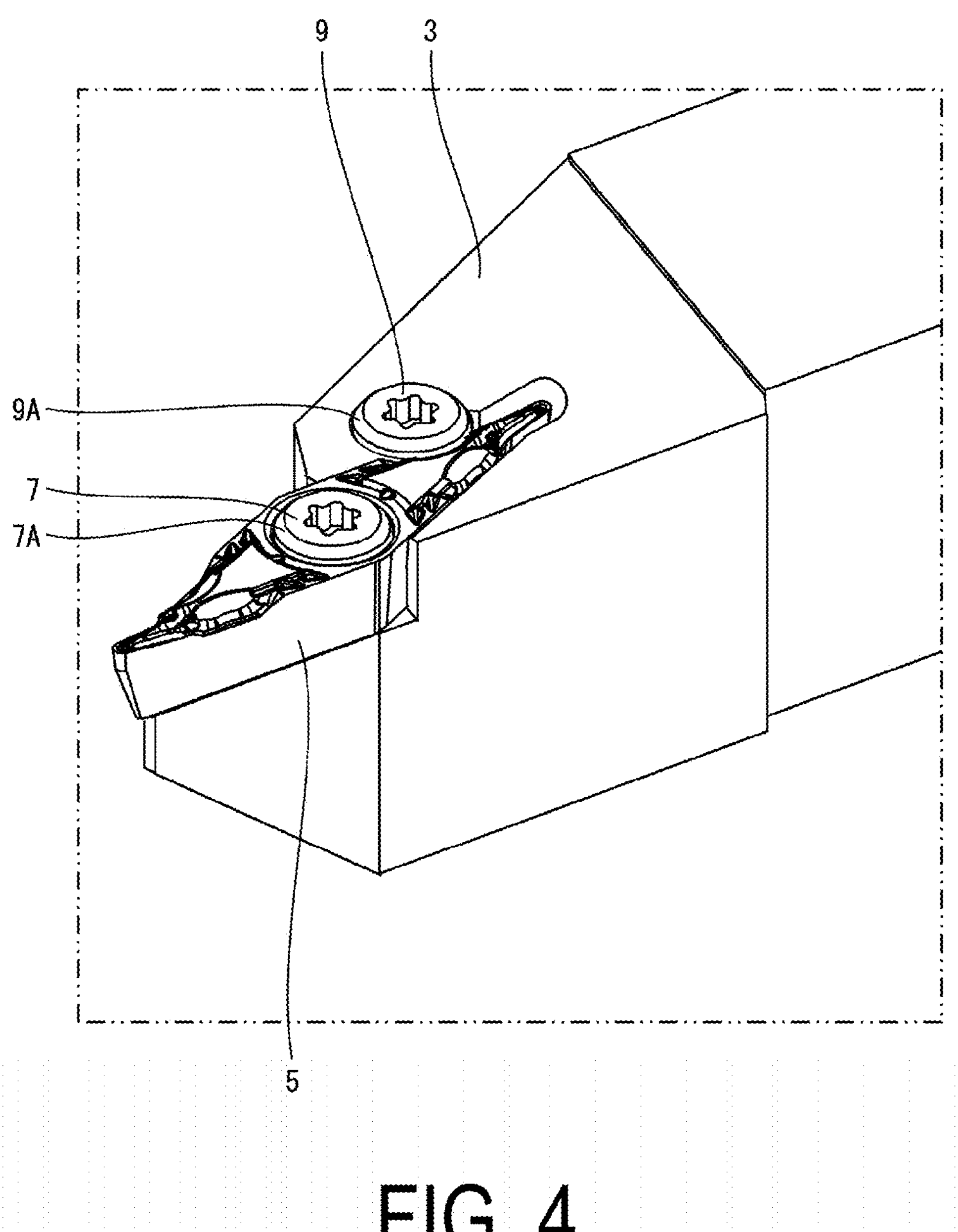
FIG. 4 is an enlarged view of a region A2 illustrated in FIG. 3.
Figure 5:
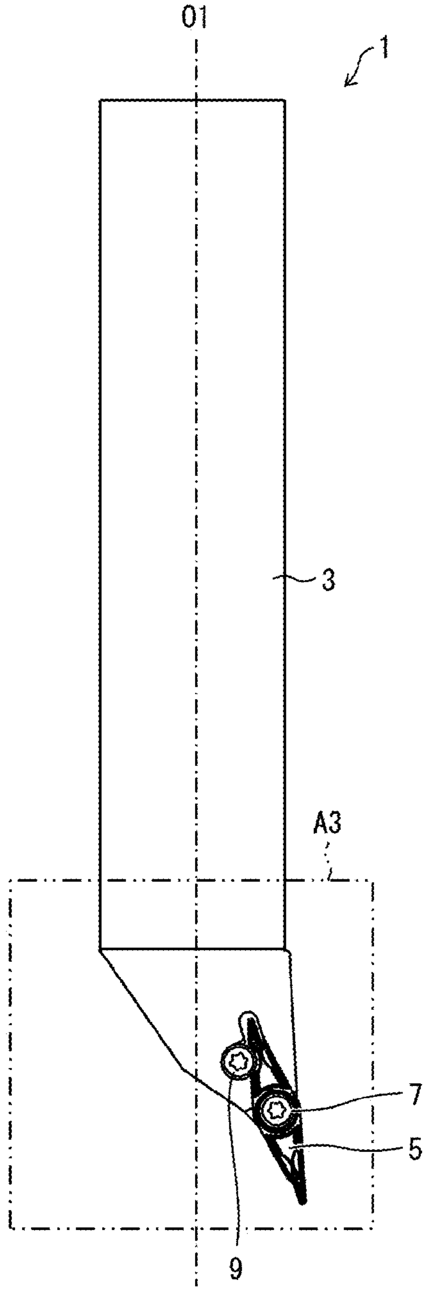
FIG. 5 is a front view of an upper surface in the cutting tool illustrated in FIG. 1.
Figure 6:
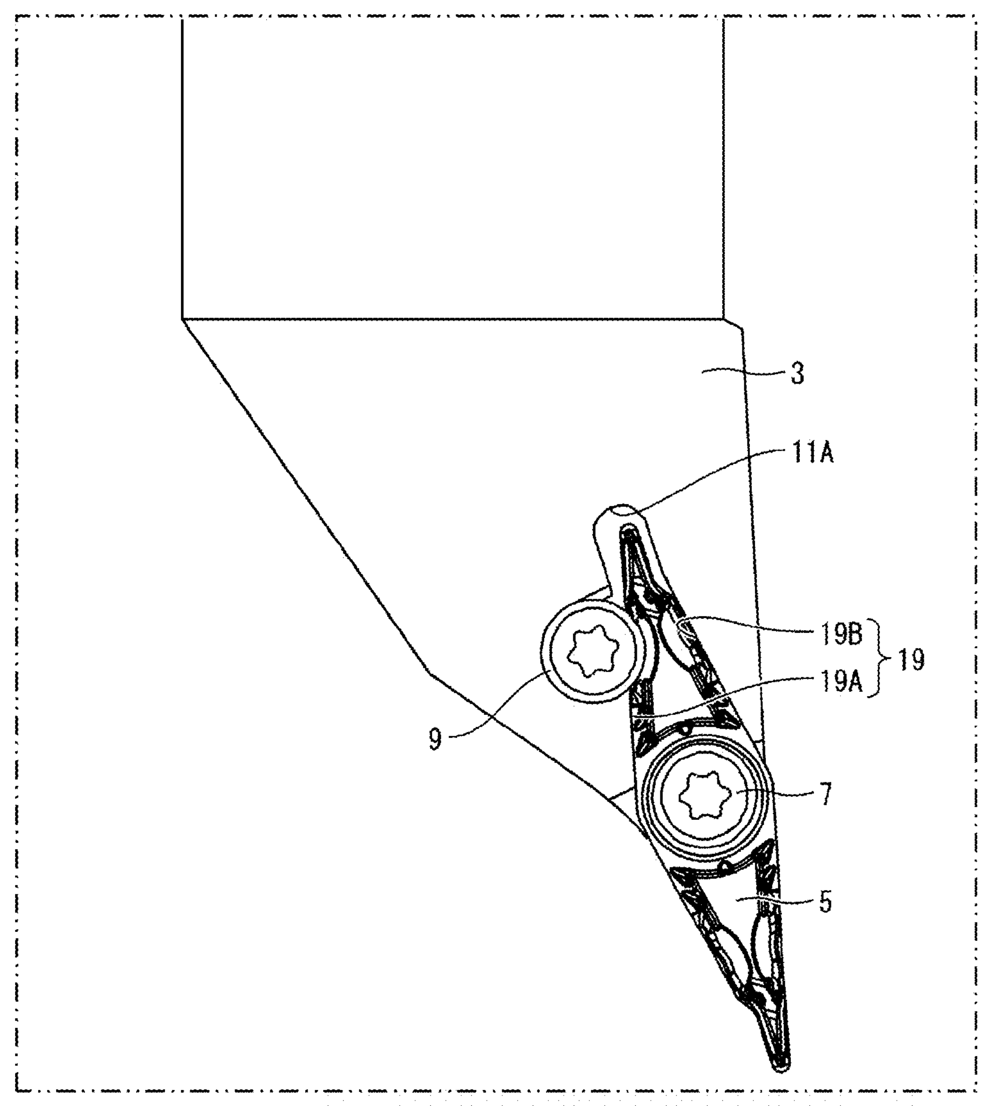
FIG. 6 is an enlarged view of a region A3 illustrated in FIG. 5.
Figure 7:
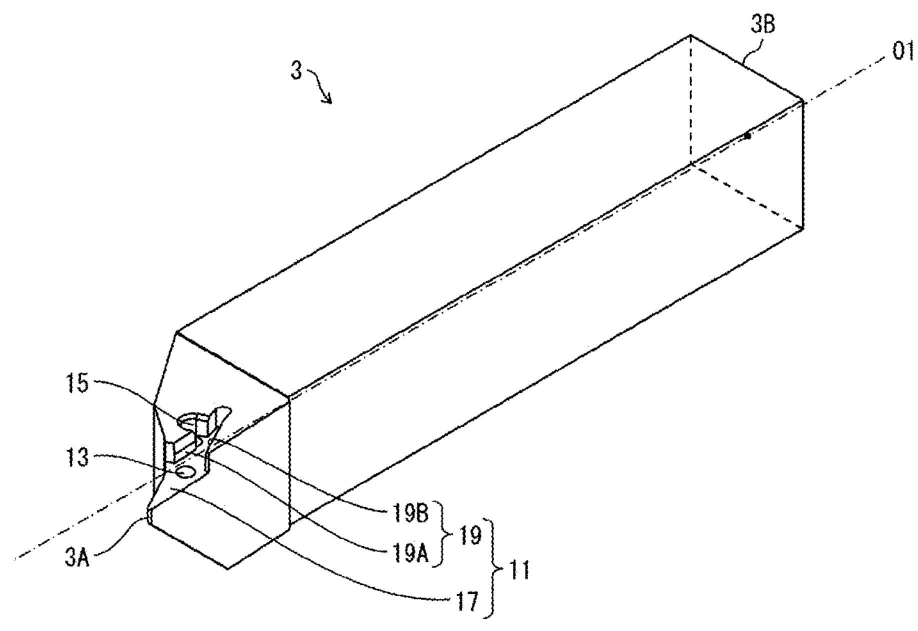
FIG. 7 is a perspective view of a holder in the cutting tool illustrated in FIG. 1.

First, to facilitate understanding of an insert of a non-limiting embodiment of the present disclosure, an example of a cutting tool provided with the insert will be schematically described below with reference to FIG. 1 to FIG. 7. FIG. 1 is a perspective view illustrating a cutting tool 1 of a non-limiting example. FIG. 2 is an enlarged view of a region A1 illustrated in FIG. 1. FIG. 3 is a perspective view of the cutting tool 1 illustrated in FIG. 1 viewed at a different angle. FIG. 4 is an enlarged view of a region A2 illustrated in FIG. 3. FIG. 5 is a front view of an upper surface 51 of an insert 5 in the cutting tool 1 illustrated in FIG. 1. FIG. 6 is an enlarged view of a region A3 illustrated in FIG. 5. FIG. 7 is a perspective view of a holder 3 in the cutting tool 1 illustrated in FIG. 1.

The cutting tool 1 illustrated as an example in FIG. 1 to FIG. 6 includes the holder 3, the insert 5, a first screw 7, and a second screw 9. The cutting tool 1 is, for example, a turning tool. Specific examples of the cutting tool 1 include a tool for outer diameter machining, a tool for inner diameter machining, a tool for grooving, and a tool for performing a cutting-off process.

Holder

As illustrated in FIG. 1 to FIG. 7, the holder 3 has a rod-like shape extending along the center axis from a first end 3A toward a second end 3B, for example. Hereinafter, the center axis of the holder 3 is referred to as a first center axis O1. In general, the first end 3A is referred to as a front end, and the second end 3B is referred to as a rear end. A portion of the holder 3 on the side of the second end 3B (a portion indicated by a quadrangular prismatic shape in FIG. 1) is also referred to as a shank that can be held by a machine tool. The first center axis O1 can be specified by defining a virtual straight line that passes through the center of an end surface of the holder 3 on a side of the second end 3B, and is parallel to lateral surfaces of the shank, for example. The holder 3 includes a pocket 11, a first screw hole 13, and a second screw hole 15.

The pocket 11 is a portion to which the insert 5 is attached, and may be located on a side of the first end 3A of the holder 3. The pocket 11 in one example may be located to include the first end 3A and may open at the first end 3A. The pocket 11 may include a seating surface 17 and a restraining lateral surface 19 as surfaces with which the insert 5 comes into contact. The restraining lateral surface 19 may be a surface orthogonal to or inclined with respect to the seating surface 17. The seating surface 17 may extend parallel to the first center axis O1. The restraining lateral surface 19 may be inclined with respect to the first center axis O1.

The restraining lateral surface 19 may include a first restraining lateral surface 19A on a side close to the first center axis O1 and a second restraining lateral surface 19B on a side far from the first center axis O1. The pocket 11 may include, on the side of the second end 3B, an accommodation space 11A that accommodates a front end portion of the insert 5.

Each of the first screw hole 13 and the second screw hole 15 is a surface to which a screw for fixing the insert 5 to the holder 3 is attached. The screws for fixing the insert 5 to the holder 3 include the first screw 7 and the second screw 9.

The first screw hole 13 may open in the pocket 11. For example, the first screw hole 13 may open in the seating surface 17 as illustrated in FIG. 7. The second screw hole 15 may be located closer to the second end 3B than the first screw hole 13 is. The second screw hole 15 may open in the pocket 11 like the first screw hole 13, or may be located away from the pocket 11. The second screw hole 15 in the example illustrated in FIG. 7 may open in the pocket 11 and may be located to be connected with the first restraining lateral surface 19A.

For a member forming the holder 3, steel, cast iron, aluminum alloy, or the like may be used, for example. The size of the holder 3 may be set suitably depending on the size of the workpiece. The length of the holder 3 in a direction along the first center axis O1 may be set to be about, for example, equal to or greater than 50 mm and equal to or less than 200 mm. The width in a direction orthogonal to the first center axis O1 may be set to be about, for example, equal to or greater than 5 mm and equal to or less than 30 mm As will be described in detail below, the insert 5 includes a recessed portion 64. A second screw head 9A that is a head portion of the second screw 9 is in contact with the recessed portion 64, in a state where the second screw 9 is inserted in the second screw hole 15. In the cutting tool 1, as illustrated in FIG. 1 to FIG. 6, the insert 5 is fixed to the holder 3 using both the first screw 7 and the second screw 9.

Main Points Regarding Insert

In recent years, there has been a demand for cutting tools with which more complicated (detailed) machining can be performed on a workpiece. The cutting tools are also required to enable machining under a high machining load, for the sake of higher machining efficiency. In addition to the above-described demands, there is a problem in that machining accuracy is compromised when the insert is shaken during machining.

The plurality of demands described above are difficult to satisfy through a simple change in the shape of the insert. This is due to the following reasons, for example. Specifically, (i) an insert having a shape with a narrow front end, as a result of increasing the length in the longitudinal direction, will have a larger load applied to the first screw hole 13 and the first screw 7 during machining (ii) To make the shape of the insert thin on the whole, the diameter of the first screw 7 needs to be small. As a result, the restraining force of the first screw 7 and the strength of the insert itself may be compromised. (iii) The insert usually has a shape with some play (clearance) for the pocket 11 of the holder, and the insert needs to be rigidly restrained in a state where the insert is attached to the pocket 11, to guarantee the accuracy of machining.

In view of the above, the insert 5 of a non-limiting embodiment of the present disclosure has a shape in which, schematically, the front end portion is thin while a center portion is guaranteed to be thick, and includes the recessed portion 64 with which the second screw 9 comes into contact. In the insert 5, the position of the front end portion and the position of the recessed portion 64 do not overlap each other in the longitudinal direction.

According to an aspect of the present disclosure, a cutting insert enabling complicated machining can be achieved, while guaranteeing durability.

2. Details of Insert

Figure 8:
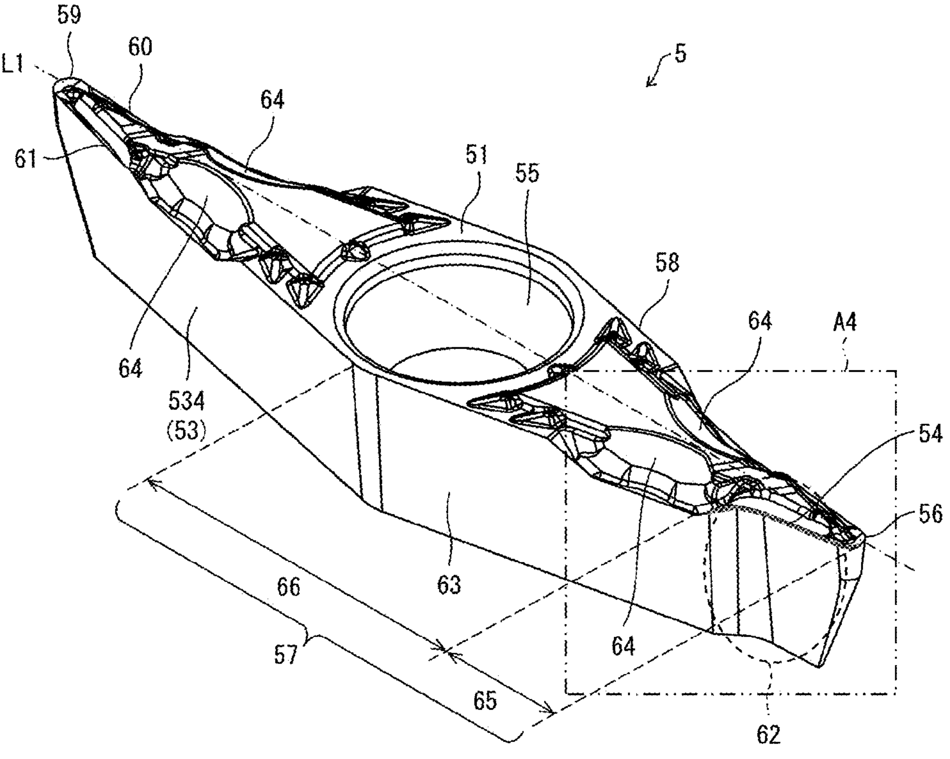
FIG. 8 is a perspective view illustrating an insert of a non-limiting example.
Figure 9:
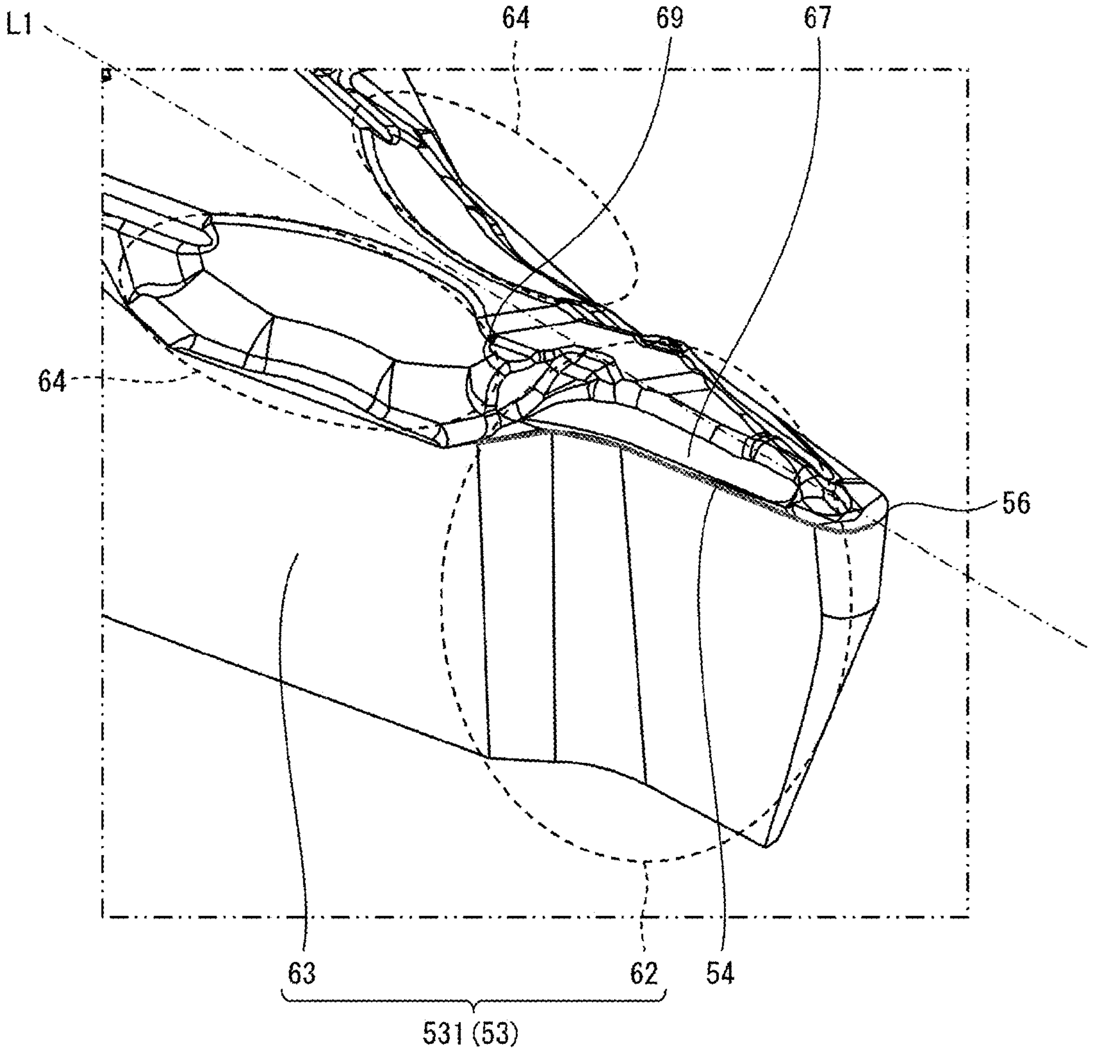
FIG. 9 is an enlarged view of a region A4 illustrated in FIG. 8.
Figure 10:
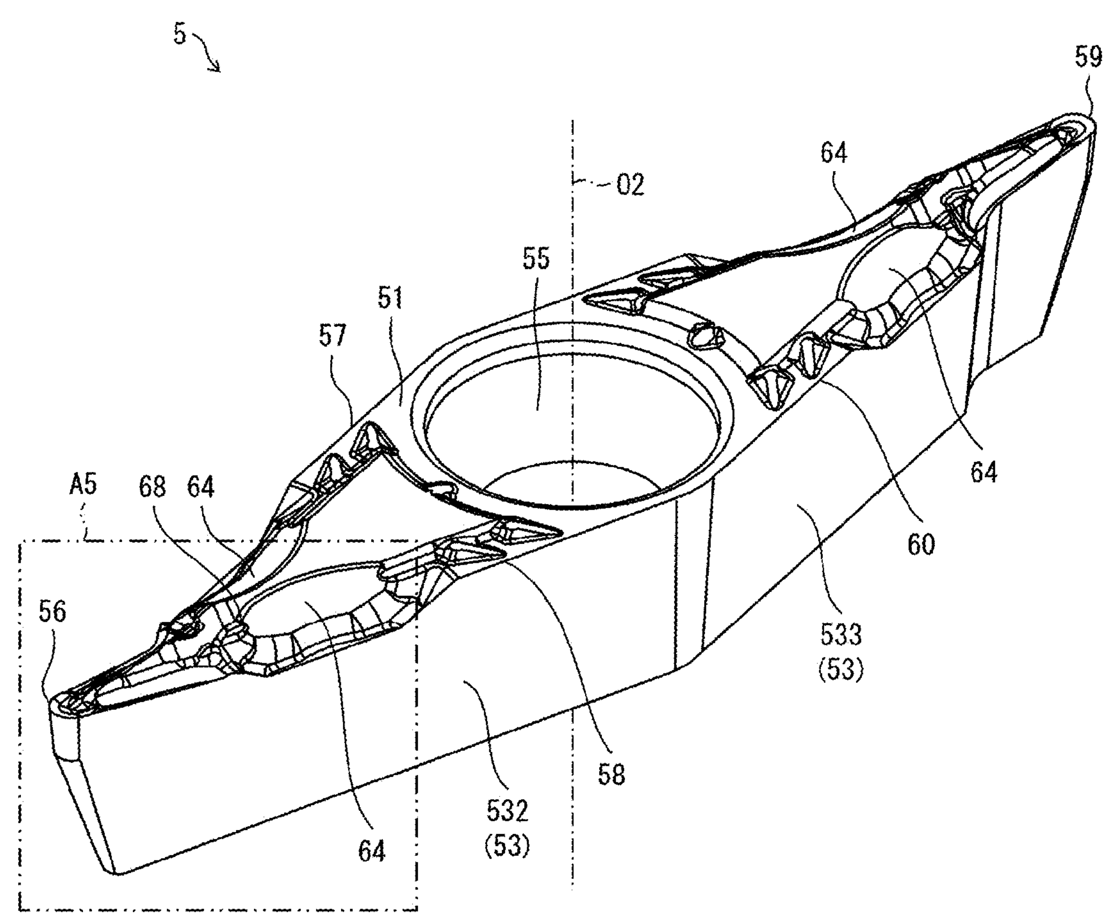
FIG. 10 is a perspective view of the insert illustrated in FIG. 8 viewed at a different angle.
Figure 11:
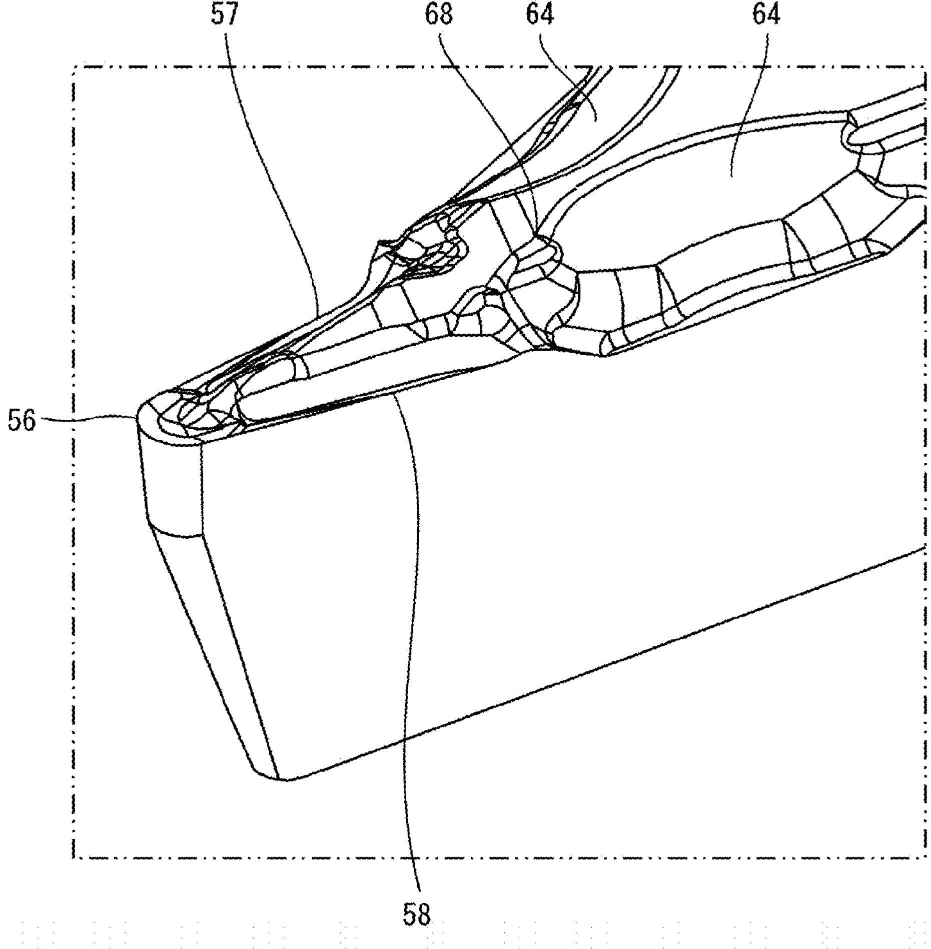
FIG. 11 is an enlarged view of a region A5 illustrated in FIG. 10.
Figure 12:
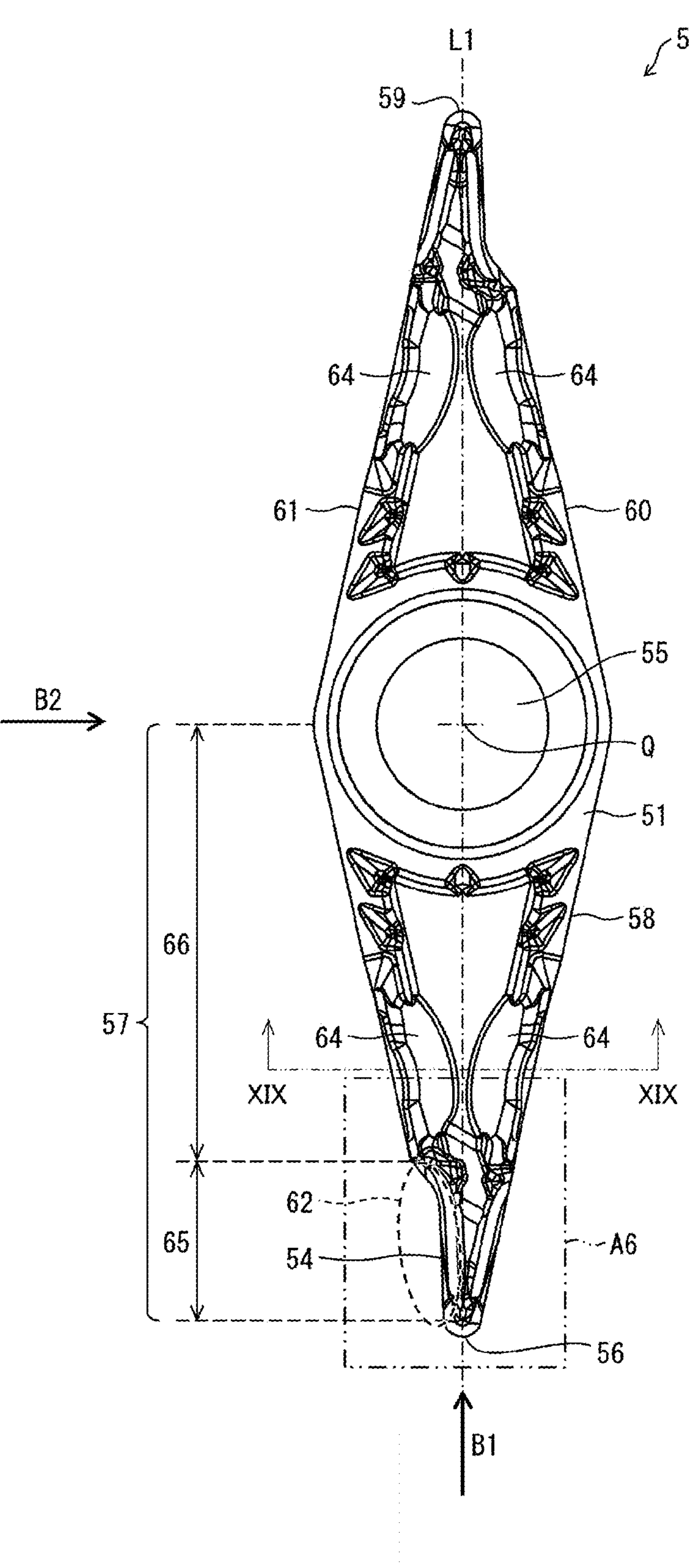
FIG. 12 is a front view of an upper surface of the insert illustrated in FIG. 8.
Figure 13:
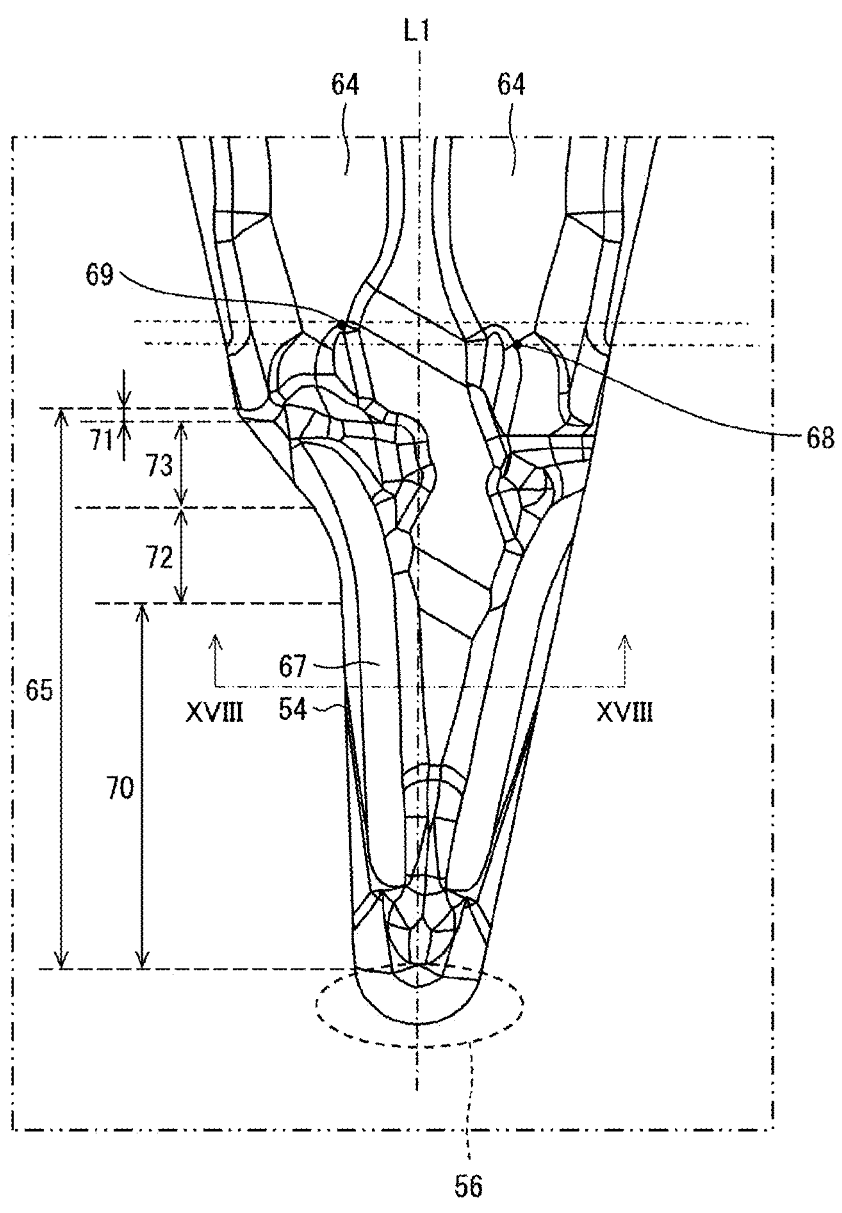
FIG. 13 is an enlarged view of a region A6 illustrated in FIG. 12.

The insert 5 according to an embodiment will be described below in detail with reference to the drawings. FIG. 8 is a perspective view illustrating the insert 5 of a non-limiting example. FIG. 9 is an enlarged view of a region A4 illustrated in FIG. 8. FIG. 10 is a perspective view of the insert 5 illustrated in FIG. 8 viewed at a different angle. FIG. 11 is an enlarged view of a region A5 illustrated in FIG. 10. FIG. 12 is a plan view, that is, a front view (upper view) of the upper surface 51 of the insert 5 illustrated in FIG. 8. FIG. 13 is an enlarged view of a region A6 illustrated in FIG. 12.

Figures 14, 15:
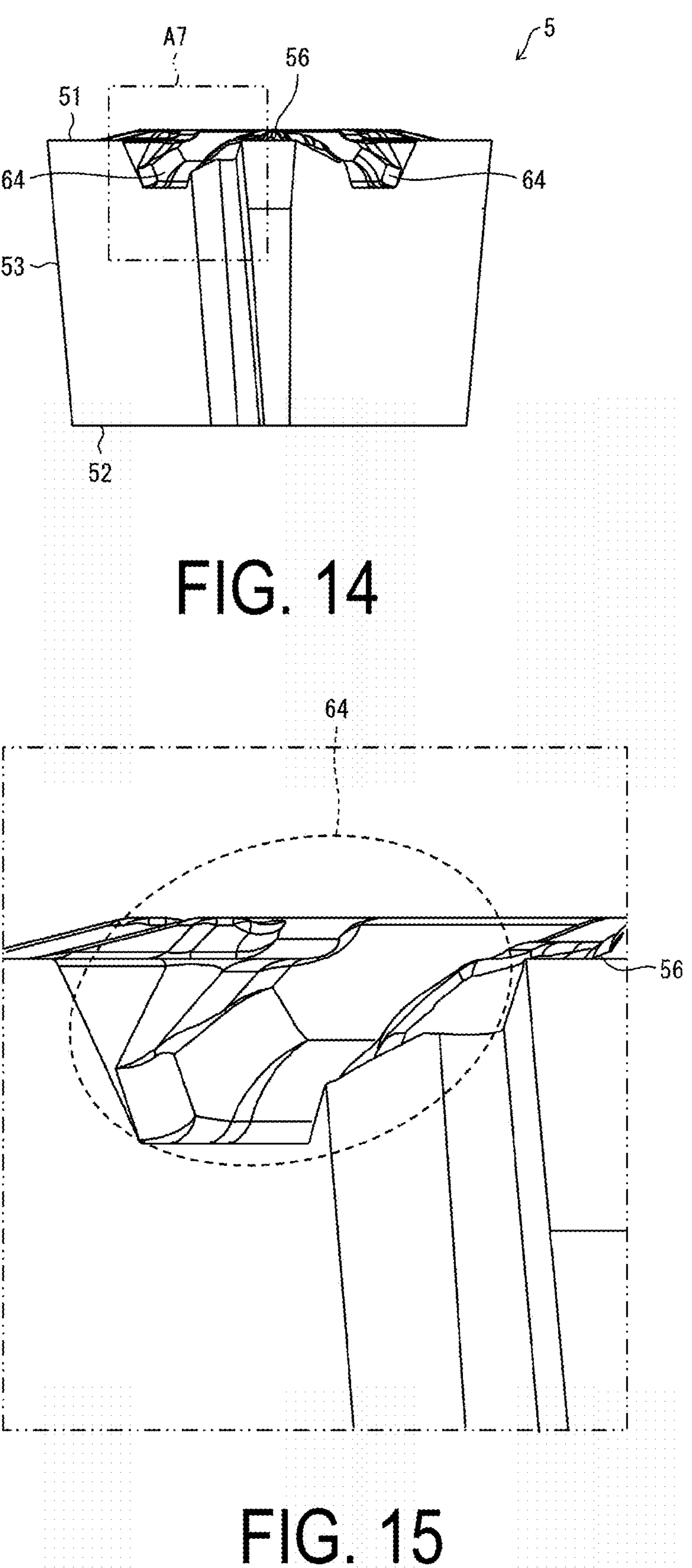
FIG. 14 is a front view of the insert illustrated in FIG. 12 viewed in a B1 direction.
FIG. 15 is an enlarged view of a region A7 illustrated in FIG. 14.
Figure 16:
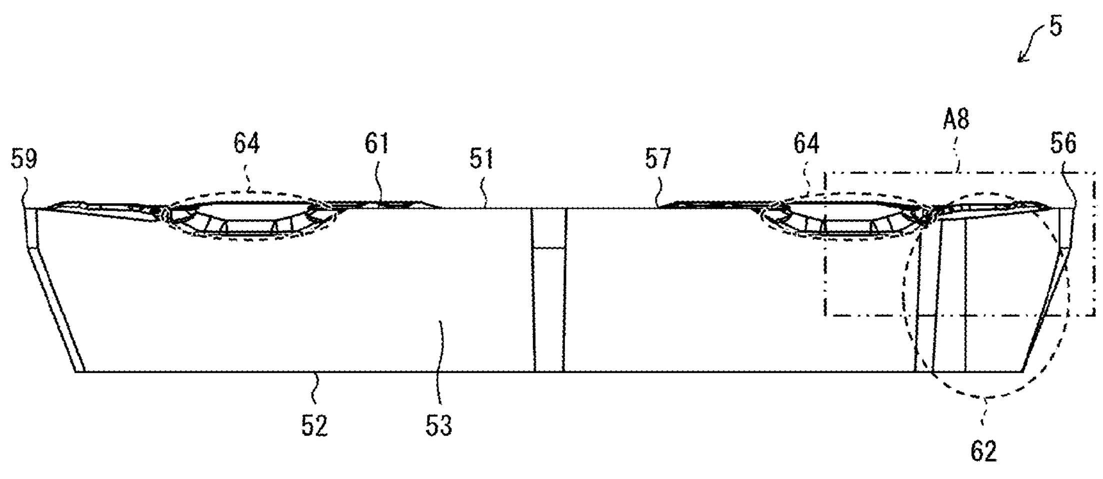
FIG. 16 is a side view of the insert illustrated in FIG. 12 viewed from a B2 direction.
Figure 17:
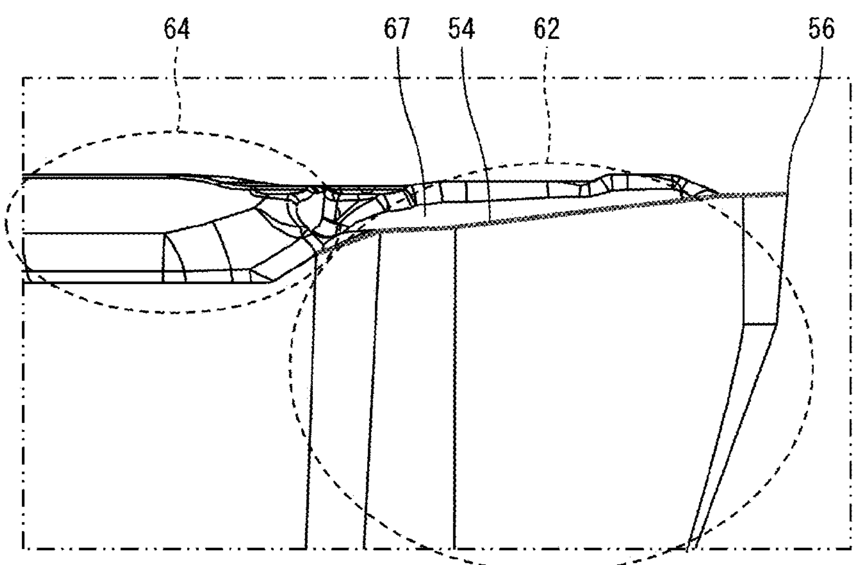
FIG. 17 is an enlarged view of a region A8 illustrated in FIG. 16.
Figure 18:
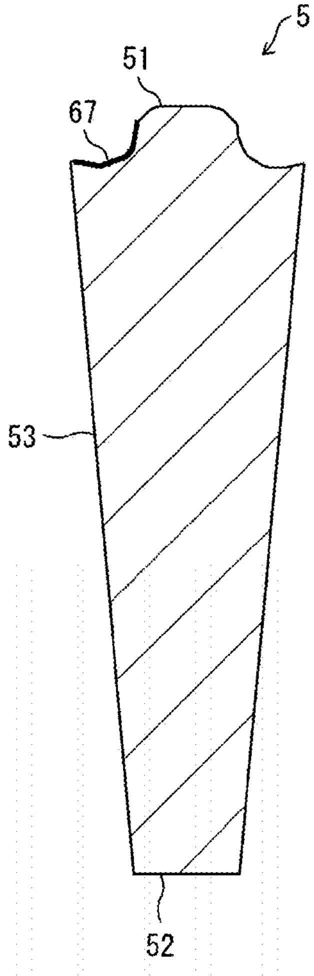
FIG. 18 is an enlarged cross-sectional view of the insert illustrated in FIG. 13 taken along line XVIII-XVIII.
Figure 19:
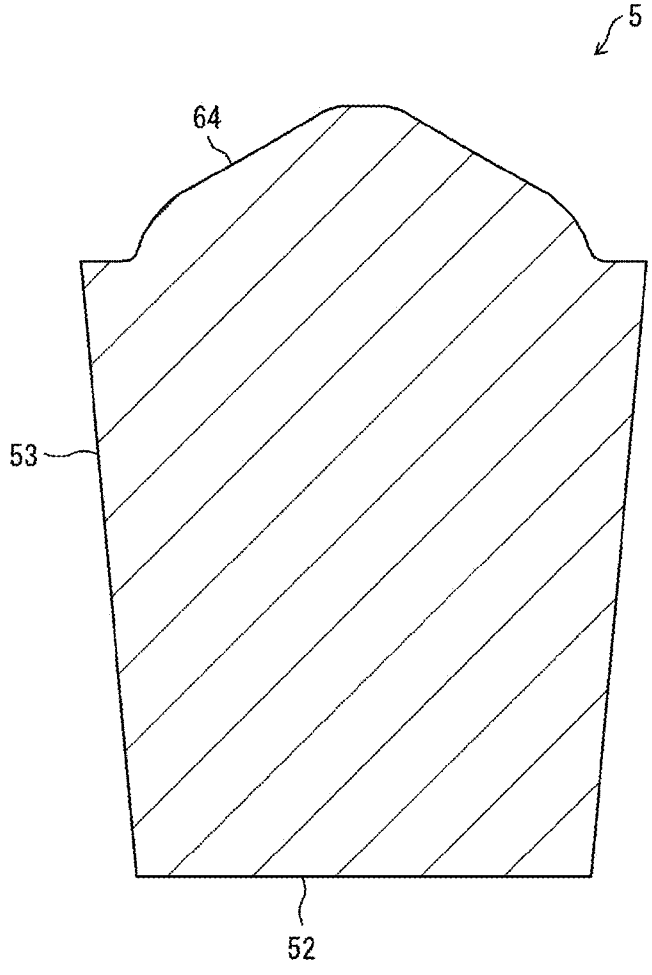
FIG. 19 is an enlarged cross-sectional view of the insert illustrated in FIG. 12 taken along line XIX-XIX.

FIG. 14 is a front view of the insert 5 illustrated in FIG. 12 viewed in a B1 direction. FIG. 15 is an enlarged view of a region A7 illustrated in FIG. 14. FIG. 16 is a side view of the insert 5 illustrated in FIG. 12 viewed in a B2 direction. FIG. 17 is an enlarged view of a region A8 illustrated in FIG. 16. FIG. 18 is an enlarged cross-sectional view of the insert 5 illustrated in FIG. 13 taken along line XVIII-XVIII. FIG. 19 is an enlarged cross-sectional view of the insert 5 illustrated in FIG. 12 taken along line XIX-XIX.

As illustrated in FIGS. 8 to 19, the insert 5 includes the upper surface 51, a lower surface 52 located on the opposite side to the upper surface 51, a lateral surface 53 located between the upper surface 51 and the lower surface 52, a cutting edge 54, and a through hole open in the upper surface 51 and the lower surface 52. The insert 5 is not limited to a specific shape, and may have a shape illustrated in FIG. 12 as an example in which the insert 5 has, in an upper view, a substantially rectangular shape (substantially rhombic shape) partially recessed to have two front end portions in the longitudinal direction being thinner than other portions.

The insert 5 of a non-limiting example may have the upper surface 51 point-symmetrical with respect to a center point Q of the through hole 55 in an upper view, to be a so-called double-sided insert.

The upper surface 51 may have four corners and four sides as illustrated in FIG. 12 and other figures. Of the four corners, one of the two corners in the longitudinal direction is referred to as a first corner 56, and the other one is referred to as a second corner 59.

The upper surface 51 may include the first corner 56 having a protruding curve shape, a first side 57 extending from the first corner 56, and a second side 58 extending from the first corner 56. The first side 57 is a side, of the sides in contact with the first corner 56, on which at least a portion in the cutting edge 54 that may function as a main edge is located. The second side 58 is a side, of the sides in contact with the first corner 56, on the opposite side to the first side 57. The cutting edge 54 need not be located on the second side 58. The upper surface 51 may have the second corner 59 having the same or substantially the same shape as the first corner 56 on the opposite side with respect to the through hole 55, a third side 60 extending from the second corner 59, and a fourth side 61 extending from the second corner 59. The cutting edge 54 on a side of the second corner 59 is located on the third side 60.

Here, a portion of the upper surface 51 located farthest in a major axis direction is referred to as the front end. In a front view (upper view) of the upper surface 51, a virtual straight line passing through the front end of the first corner 56 and extending in the major axis direction of the upper surface 51 is referred to as an axis L1. Since the upper surface 51 of the insert 5 has a 180° rotationally symmetric shape, the axis L1 may be a virtual straight line passing through the front end of the first corner 56 and the front end of the second corner 59 in an upper view. When the through hole 55 is provided at the center of the upper surface 51, the axis L1 may pass through the center point Q of the through hole 55.

The axis L1 may be a line bisecting or substantially bisecting an angle at an intersection formed by virtually extending the first side 57 and the second side 58 that are in a linear form, in the vicinity of the center portion of the insert 5. Since the upper surface 51 of the insert 5 has a 180° rotationally symmetric shape, the relationship between the axis L1 and the third side 60 and the fourth side 61 on the side of the second corner 59 is the same as the relationship described above.

The lower surface 52 is a surface located on the opposite side to the upper surface 51, and may be in contact with the seating surface 17 when the insert 5 is attached to the holder 3. The lower surface 52 may have the same shape as the upper surface 51, or may have a different shape from the upper surface 51. In the insert 5 of an example, the lower surface 52 has a polygonal shape like the upper surface 51.

The lateral surface 53 includes a first lateral surface 531 extending from the first side 57 to the lower surface 52, a second lateral surface 532 extending from the second side 58 to the lower surface 52, a third lateral surface 533 extending from the third side 60 to the lower surface 52, and a fourth lateral surface 534 extending from the fourth side 61 to the lower surface 52.

The first lateral surface 531 may include a first region 62 recessed toward the axis L1 to have a recessed shape and a flat second region 63 located farther from the first corner 56 than the first region 62. The second lateral surface 532 may be a flat surface on the whole (see FIG. 10 and other figures). The third lateral surface 533 may have the same or substantially the same shape as the first lateral surface 531, that is, may have regions corresponding to the first region 62 and the second region 63. The fourth lateral surface 534 may have the same or substantially the same shape as the second lateral surface 532.

Note that, in this specification, the description of "flat" or "flat surface" is intended to mean that the surface is not a curved surface at a visible level or does not have unevenness at a visible level, and is not required to be strictly flat. Thus, for a surface referred to as being "flat" or "flat surface", an unavoidable degree of unevenness may be allowed in the manufacture of the insert 5. Specifically, unevenness with a surface roughness of about 50 μm may be allowed for example.

In addition, in this specification, the description of "linear shape" regarding a side is intended to mean a substantially linear shape, and does not necessarily indicate a strictly linear shape (a linear shape having zero curvature). Therefore, a side referred to as having a "linear shape" may have a substantially linear shape, may have a shape having an unavoidable degree of undulation in the manufacture of the insert 5, or may have unevenness or the like as long as the function of the insert 5 in an example of the present disclosure is not compromised. To be specific, in the case of a curve whose radius of curvature is much larger than a first radius of curvature to a third radius of curvature to be described below, for example, if the curve is an extremely gentle curve whose radius of curvature exceeds 100 mm, the curve may be regarded as a straight line.

The cutting edge 54 is located on the first corner 56 and the first side 57 and, as an example, cuts a rotating workpiece 101 (see FIGS. 20 to 22) by coming into contact with the workpiece 101. The cutting edge 54 may be located over the entirety or part of the first corner 56. The cutting edge 54 may be located over the entirety or part of the first side 57. A portion of the cutting edge 54 located on the first side 57 may function as a main edge for machining. Therefore, in general, the portion of the cutting edge 54 located on the first side 57 may be referred to as a main cutting edge.

The cutting edge 54 may be located over part of the second side 58, for example. A portion of the cutting edge 54 located on the second side 58 can also be used as, for example, a flat cutting edge or a cutting edge for countersinking. Therefore, in general, the portion of the cutting edge 54 located on the second side 58 may be referred to as an auxiliary cutting edge or a sub cutting edge. The insert 5 may have a configuration in which the cutting edge 54 is also provided on the second corner 59, on the third side 60, and on the fourth side 61.

The through hole 55 is a portion where a fixing member, for fixing the insert 5 to the holder 3, is attached. In the example illustrated in FIG. 1 and the like, the first screw 7 is inserted as the fixing member. The through hole 55 may have a tapered-shape portion near an opening portion in the upper surface 51. In other words, on a side of the upper surface 51, the through hole 55 may have a portion with the inner diameter increasing toward the upper surface 51 from the lower surface 52. The insert 5 may be fixed to the holder 3, with a first screw head 7A (see FIG. 4), which is the head portion of the first screw 7, brought into contact with this portion.

The through hole 55 may open at the center of the upper surface 51 and the center of the lower surface 52. In such a case, the center axis of the insert 5 (hereinafter, referred to as a center axis O2) indicated by a virtual straight line passing through the center of the upper surface 51 and the center of the lower surface 52 may match the center axis of the through hole 55 (see FIG. 10). The center axis O2 may be the axis of rotational symmetry of the insert 5.

As illustrated in FIG. 12, the upper surface 51 may include the recessed portion 64 located between the second side 58 and the axis L1 and recessed toward the axis L1 in an upper view. In addition, the upper surface 51 may include the recessed portion 64 that is located between the fourth side 61 and the axis L1 and is recessed toward the axis L1.

The head portion of the second screw 9 can be brought into contact with the recessed portion 64, and the insert 5 is screwed to the holder 3 with the head portion of the second screw 9 being in contact with the recessed portion 64. Furthermore, the insert 5 may include a plurality of the recessed portions 64. In the example illustrated in FIG. 8 and other figures, the recessed portion 64 may be located on each of the four sides of the upper surface 51.

In the cutting tool 1 of the above-described example, the insert 5 is attached and fixed to the holder 3 for allowing use of the cutting edge 54 on a side of the first corner 56, and the second screw 9 is brought into contact with the recessed portion 64 located on the fourth side 61.

However, the cutting tool 1 is not limited to this example, and the insert 5 may be attached to the holder 3 with the second screw 9 brought into contact with the recessed portion 64 located on the third side 60. The recessed portion 64 located on the third side 60 and/or the recessed portion 64 located on the fourth side 61 may be used in accordance with the usage mode of the cutting tool 1 (the shape of the holder 3, the direction in which the first corner 56 of the insert 5 protrudes from the holder 3, the direction in which chips flow, and the like).

In addition, when the insert 5 is attached and fixed to the holder 3 for allowing use of the cutting edge 54 on the side of the second corner 59, any one of the recessed portion 64 located on the first side 57 and the recessed portion 64 located on the second side 58 may be used.

In the present embodiment, the recessed portion 64 located on the first side 57 and the recessed portion 64 located on the second side 58 will be described. The recessed portion 64 located on the third side 60 may have the same configuration as the recessed portion 64 located on the first side 57, and the recessed portion 64 located on the fourth side 61 may have the same configuration as the recessed portion 64 located on the second side 58.

In the insert 5, the entirety of the recessed portion 64 is located farther from the first corner 56 than the entirety of the first region 62 in the direction along the axis L1. In the insert 5, the entirety of the recessed portion 64 is located farther from the second corner 59 than the entirety of the first region 62 in the direction along the axis L1.

The insert 5 has the first region 62 having a recessed shape, and thus has a narrowed front end portion. This makes it easy to perform complicated machining. The insert 5 is fixed to the holder 3 with the second screw 9 brought into contact with the recessed portion 64, whereby the insert 5 is fixed more firmly than in a case where the insert 5 is fixed to the holder 3 using only the first screw 7 inserted into the through hole 55.

To be specific, in the example illustrated in FIG. 1 and the like, the lower surface 52 is pressed against the seating surface 17, the third lateral surface 533 and the second restraining lateral surface 19B are in contact with each other, and at least part of the fourth lateral surface 534 and the first restraining lateral surface 19A are in contact with each other. With this configuration, the insert 5 is more firmly restrained, whereby a risk of occurrence of shaking of the insert 5 in the pocket 11 during machining can be reduced.

In the insert 5, as described above, the entirety of the recessed portion 64 is located farther from the first corner 56 or the second corner 59 than the entirety of the first region 62. With this configuration, the front end portions of the insert 5 can be guaranteed to be thick. As a result, the likelihood of the strength of the front end portions of the insert 5 being insufficient is reduced. When the cutting edge 54 on the side of the first corner 56 is used, the insert 5 is fixed to the holder 3 by the second screw 9 using the recessed portion 64 on the side of the second corner 59. Therefore, the second screw 9 does not become an obstacle during the machining of the workpiece 101.

As described above, since the insert 5 has sufficient strength while having a sharp distal end angle, complicated machining can be performed with high machining efficiency by using the cutting tool 1 including the insert 5.

The first side 57 may include a first section 65 having a recessed shape located along the first region 62, and a second section 66 having a linear shape located along the second region 63. The upper surface 51 may further include a breaker wall surface 67 that is located between the first section 65 and the axis L1, and has a portion farther from the first section 65 with increasing distance from the lower surface 52.

The recessed portion 64 may include a front end portion 68 that is closest to the first corner 56 in a direction along the axis L1. The breaker wall surface 67 may include a rear end portion 69 that is farthest from the first corner 56 in the direction along the axis L1. In the direction along the axis L1, the rear end portion 69 may be located farther from the first corner 56 than the front end portion 68.

Chips produced in a portion of the cutting edge 54 located on the first side 57 are likely to move along a direction orthogonal to the first side 57. Thus, the chips produced on the first side 57 are likely to move toward the second side 58, and may move toward the recessed portion 64 located between the second side 58 and the axis L1. The movement of the chips to the recessed portion 64 located between the second side 58 and the axis L1 involves a risk of damaging the second screw 9 or clogging a section between the recessed portion 64 and the second screw 9. Specifically, the second screw 9 might be damaged when the insert 5 is attached to the holder 3 with the second screw 9 coming into contact with the recessed portion 64 of the second side 58. When the second screw 9 does not come into contact with the recessed portion 64 of the second side 58, the chips might remain in the recessed portion 64. When the corner used is changed with the chips remaining, for example, the chips may be caught between the recessed portion 64 and the second screw 9.

On the other hand, with the above-described configuration, the chips are less likely to flow into the recessed portion 64. This is because when chips produced on the first side 57 move to the recessed portion 64 located between the second side 58 and the axis L1, the direction of the flow of the chips is likely to be changed by the breaker wall surface 67. With the breaker wall surface 67 thus suppressing the flow of the chips to the recessed portion 64, the risk described above is reduced.

As illustrated in FIG. 8 and FIG. 12, the first side 57 may include the first section 65 having a recessed shape located along the first region 62, and the second section 66 having a linear shape located along the second region 63. As illustrated in FIG. 13, the first section 65 may include a first portion 70 having a linear shape connected to the first corner 56, a second portion 71 having a protruding curve shape connected to the second section 66, and a third portion 72 having a recessed curve shape located between the first portion 70 and the second portion 71 in an upper view.

When the first side 57 has the first portion 70 having a linear shape connected to first corner 56, the direction in which chips produced by the first portion 70 flow is likely to be stabilized. Therefore, the flow of the chips on the whole is easily stabilized. For the sake of stabilization of the flow direction of the chips, the first portion 70 may be longer than the other portions forming the first section 65.

When the first side 57 includes the third portion 72 having a recessed curve shape located between the first portion 70 and the second portion 71, the cutting edge 54 has high durability. When the cutting edge 54 has a recessed shape, the machining load tends to concentrate near a bottom portion of the recessed shape. Still, when the third portion 72 corresponding to the bottom portion has a recessed curve shape, local concentration of the load at the bottom portion of the recessed shape is more likely to be avoided. Therefore, the durability of the cutting edge 54 on the whole is high.

The durability of the cutting edge 54 is high also in the case where the first side 57 includes the second portion 71 having a protruding curve shape connected to the second section 66. When the first side 57 includes the first section 65 having a recessed shape and the second section 66 having a linear shape, the machining load may concentrate at a boundary between these sections. However, when the second portion 71, which is a portion of the first section 65 connected to the second section 66, has a protruding curve shape, the first section 65 and the second section 66 are likely to be smoothly connected to each other. Thus, the machining load is less likely to concentrate on the boundary between the first section 65 and the second section 66, whereby the cutting edge 54 on the whole has high durability.

As described above, when the first side 57 includes the first portion 70, the second portion 71, and the third portion 72, both improvement in durability of the cutting edge 54 and improvement in chip dischargeability can be achieved.

In an upper view, the radius of curvature of the first corner 56 having a protruding curve shape is defined as the first radius of curvature, the radius of curvature of the second portion 71 having a protruding curve shape is defined as the second radius of curvature, and the radius of curvature of the third portion 72 having a recessed curve shape is defined as the third radius of curvature. In the insert 5, the first radius of curvature may be larger than the second radius of curvature, and the third radius of curvature may be larger than the first radius of curvature. The first radius of curvature is, for example, set to approximately 0.2 to 0.8 mm. The second radius of curvature is, for example, set to approximately 0.1 to 0.4 mm. The third radius of curvature is, for example, set to approximately 0.5 to 2 mm.

A large machining load is likely to be applied to the first corner 56 and the third portion 72 compared with the second portion 71. When all of the first radius of curvature to the third radius of curvature are large values, the insert 5 becomes large and is difficult to decrease in size. When the first radius of curvature and the third radius of curvature are larger than the second radius of curvature, the insert 5 can have a small size and high durability. Therefore, with the insert 5, complicated machining can be performed while ensuring durability.

Since the third portion 72 has a recessed shape, the chips produced in the third portion 72 are more likely to be torn along the movement direction of the chips as the chips move farther from the third portion 72. When the chips are torn, the flow of the chips may become unstable. Still, when the third radius of curvature is larger than the first radius of curvature, the third portion 72 is gently curved. Therefore, the chips are less likely to be torn. Thus, the chip dischargeability as well as the durability of the cutting edge 54 and the degree of freedom in machining can be improved.

As illustrated in FIG. 12, the first section 65 may further include a fourth portion 73 having a linear shape located between the second portion 71 and the third portion 72. In an upper view, the inclination angle of the first portion 70 with respect to the axis L1 may be smaller than the inclination angle of the second side 58 with respect to the axis L1. In a front view of the upper surface 51, the inclination angle of the fourth portion 73 with respect to the axis L1 may be larger than the inclination angle of the second side 58 with respect to the axis L1. In a front view of the upper surface 51, the inclination angle of the second section 66 with respect to the axis L1 may be the same as the inclination angle of the second side 58 with respect to the axis L1.

With the configuration described above, a large region in the thin front end portion of the insert 5 is likely to be guaranteed, compared with a case where the first section 65 does not include the fourth portion 73, for example. Therefore, complicated machining can be easily performed, and machining efficiency is improved.

As described above, for the sake of stabilization of the flow direction of the chips, the first portion 70 may be longer than the other portions forming the first section 65. Thus, the first portion 70 may be longer than the fourth portion 73.

3. Insert Material, Etc.

Examples of a material of the insert 5 include a cemented carbide alloy and a cermet. The composition of the cemented carbide alloy includes WC—Co, WC—TiC—Co, and WC—TiC—TaC—Co, for example. WC—Co is produced by adding a cobalt (Co) powder to tungsten carbide (WC) and sintering this mixture. WC—TiC—Co is formed by adding titanium carbide (TiC) to WC—Co. WC—TiC—TaC—Co is formed by adding tantalum carbide (TaC) to WC—TiC—Co.

Cermet is a sintered composite material in which a metal is combined with a ceramic component. Specifically, examples of the cermet include compounds in which a titanium compound such as titanium carbide (TiC) or titanium nitride (TiN) is the primary component.

The surface of the member described above configuring the insert 5 may be coated with a coating film using a chemical vapor deposition (CVD) method or a physical vapor deposition (PVD) method. Examples of the composition of the coating film include titanium carbide (TiC), titanium nitride (TiN), titanium carbonitride (TiCN), alumina ($Al_2O_3$), and the like.

The size of the insert 5 is not particularly limited. For example, the length of one side of the upper surface 51 having a polygonal shape may be set to about 10 to 25 mm. The height from the upper surface 51 to the lower surface 52, in other words, the height in the direction along the second center axis O2 may be set to about 2 to 5 mm.

The size of the recessed portion 64 is not particularly limited. For example, the width in a direction along the first side 57 or the second side 58 in a front view of the upper surface 51 may be set to about 3 to 8 mm. A width in a direction orthogonal to the first side 57 or the second side 58 in a front view of the upper surface 51 (length of the recessed portion 64) may be set to be about 1 to 3 mm. A width in a direction orthogonal to the first side 57 or the second side 58 in a front view of the lateral surface 53 (depth of the recessed portion 64) may be set to be about 0.5 to 1 mm.

First Screw and Second Screw

The first screw 7 is inserted into the through hole 55 and screwed into the first screw hole 13. The second screw 9 is in contact with the recessed portion 64 and screwed into the second screw hole 15. As described above, the first screw 7 and the second screw 9 are members for fixing the insert 5 to the holder 3.

Here, the first screw 7 may function as a main member for fixing the insert 5 to the holder 3. The second screw 9 may function as a member that suppresses the rotation of the insert 5 with respect to the first screw 7.

Since the recessed portion 64 opens in the lateral surface 53 and the second screw 9 comes into contact with the recessed portion 64, the rotation of the insert 5 with respect to the first screw 7 is easily suppressed by the second screw 9. In addition, since the recessed portion 64 also opens in the upper surface 51, the second screw 9 is easily attached, and the second screw 9 is easily brought into stable contact with the recessed portion 64.

In addition, the recessed portion 64 in an embodiment may be located away from the lower surface 52. Thus, as compared with the case where the recessed portion 64 reaches the lower surface 52, the volume (spatial volume) of the recessed portion 64, which is a cutout in the insert 5, can be reduced. Therefore, a decrease in durability due to the provision of the cutout in the insert 5 is suppressed. Therefore, the strength of the insert 5 can be secured while suppressing the rotation of the insert 5.

For a member forming the first screw 7 and the second screw 9, steel, cast iron, aluminum alloy, or the like may be used, for example.

Since the through hole 55 opens in the upper surface 51 and the lower surface 52, the first screw 7 may be inclined with respect to the cutting edge 54. For example, the first screw 7 may be substantially orthogonal to the cutting edge 54. On the other hand, a principal force, which is the largest force applied to the cutting edge 54 during machining, is likely to be applied mainly in a direction orthogonal to the cutting edge 54. Therefore, the principal force, which is the largest force applied to the cutting edge 54 during machining, is less likely to be directly transmitted to the first screw 7, whereby the first screw 7 has high durability.

Here, the second screw 9 may also be orthogonal to the cutting edge 54. In this case, the above-described principal force is less likely to be directly transmitted to the second screw 9, whereby the second screw 9 has high durability.

The second screw 9 may be inclined with respect to the first screw 7 or may be parallel to the first screw 7. When the second screw 9 is parallel to the first screw 7, suppression of the rotation of the insert 5 is easier. This is because although the insert 5 easily rotates with respect to the first screw 7, since the second screw 9 is orthogonal to the rotation direction, the rotational movement of the insert 5 can be stably received by the second screw 9.

The second screw 9 in contact with the recessed portion 64 of the insert 5 may be separated from the lateral surface 53. In this case, the lateral surface 53, which can be used as a flank, is less likely to be damaged. While the second screw head 9A (see FIG. 4) comes into contact with the recessed portion 64, a thread groove of the second screw 9 is less likely to come into contact with the insert 5. Therefore, the thread groove of the second screw 9 is less likely to be damaged.

As described above, the pocket 11 of the holder 3 may include the restraining lateral surface 19. The lateral surface 53 of the insert 5 may be brought into contact with the restraining lateral surface 19. In this case, the insert 5 may be positioned to be sandwiched between the restraining lateral surface 19 and the second screw 9. When the insert 5 is positioned to be sandwiched between the restraining lateral surface 19 and the second screw 9 as described above, the insert 5 is less likely to be displaced.

When the restraining lateral surface 19 is inclined with respect to the first center axis O, thrust force, which is one type of force applied to the cutting edge 54 during machining, is likely to be received by the restraining lateral surface 19. Therefore, the load on the first screw 7 and the second screw 9 due to the thrust force is likely to be reduced. Thus, the first screw 7 and the second screw 9 have high durability. For example, as illustrated in FIG. 7, when the restraining lateral surface 19 is inclined so as to have a portion closer to the first end 3A being farther from the first center axis O, the thrust force is likely to be received by the restraining lateral surface 19.

The first screw 7 and the second screw 9 may have different sizes or may have the same size. When the first screw 7 and the second screw 9 have the same size, for example, the first screw 7 and the second screw 9 can be attached the other way round without a problem. This makes the manufacturing of the cutting tool 1 or the replacement work for the insert 5 easy. The same screw can be used as the first screw 7 and the second screw 9, whereby the manufacturing cost can be reduced.

4. Example of Configuration of Insert

As illustrated in FIG. 12, in the present embodiment, a configuration in which the first side 57 and the cutting edge 54 are located on the left side in an upper view of the insert 5 will be described as an example, but the configuration is not limited to this. For example, the insert 5 may be configured with the first side 57 and the cutting edge 54 located on the right side in an upper view. In other words, the insert 5 may have a shape obtained by mirror-reversing the shape illustrated in FIG. 12 and other figures.

5. Method for Manufacturing Machined Product

Figure 20:
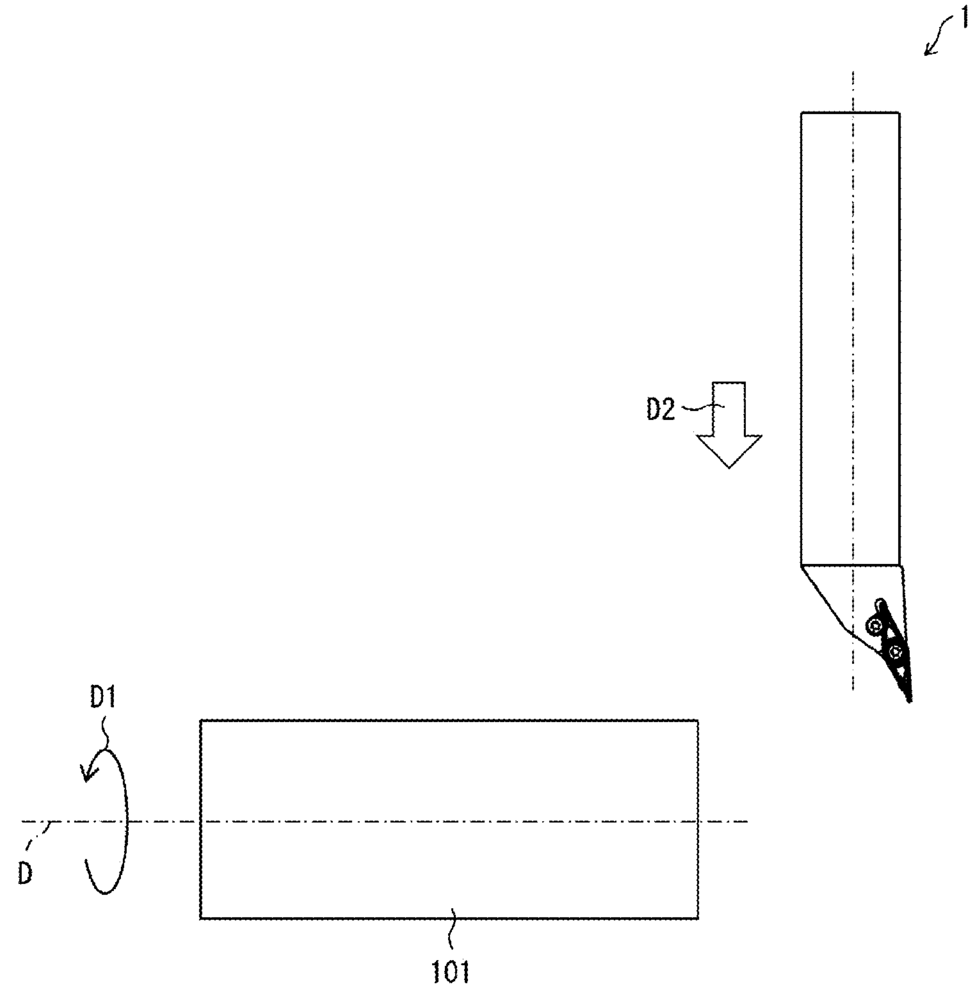
FIG. 20 is a schematic diagram illustrating a process of a method for manufacturing a machined product of a non-limiting example.
Figure 21:
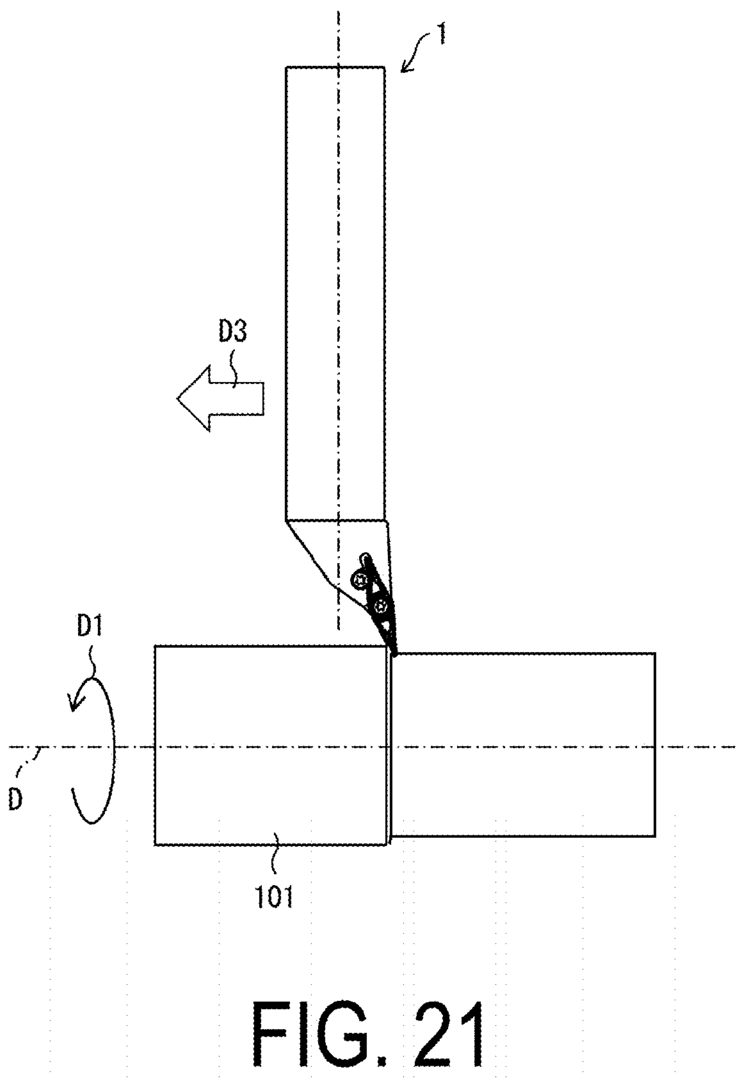
FIG. 21 is a schematic diagram illustrating a process of the method for manufacturing a machined product of a non-limiting example.
Figure 22:
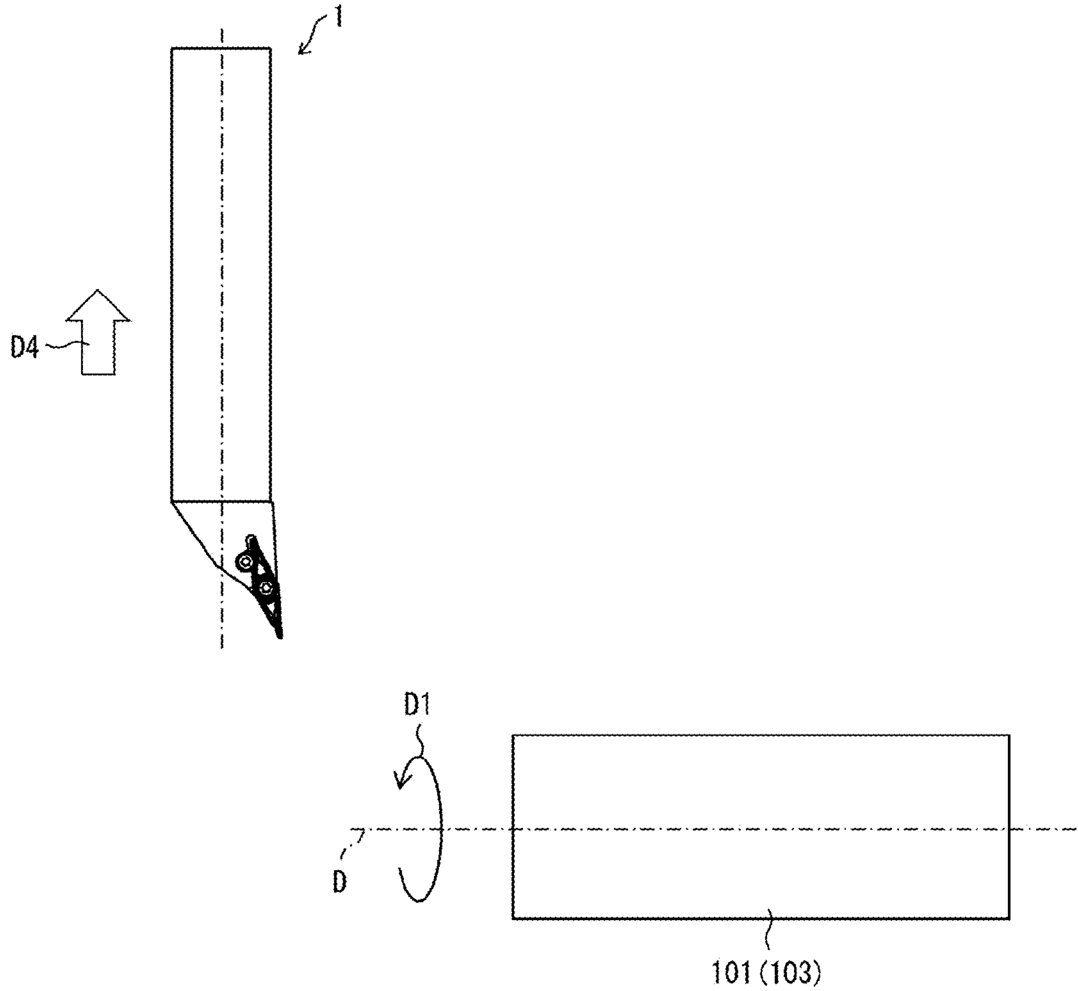
FIG. 22 is a schematic diagram illustrating a process of the method for manufacturing a machined product of a non-limiting example.

Next, description will be given of a method for manufacturing a machined product according to an embodiment. FIG. 20 is a schematic diagram illustrating a process of the method for manufacturing a machined product 103 of a non-limiting example. FIG. 21 is a schematic diagram illustrating a process of the method for manufacturing the machined product 103 of a non-limiting example. FIG. 22 is a schematic diagram illustrating a process of the method for manufacturing the machined product 103 of a non-limiting example.

The machined product 103 is manufactured by machining the workpiece 101. In the embodiment, outer diameter machining is given as an example of the machining. The method for manufacturing the machined product 103 according to the embodiment includes the following steps. That is, the method includes:

(1) rotating the workpiece 101, (2) bringing the cutting tool 1 represented in the embodiment described above into contact with the workpiece 101 that is rotating, and (3) separating the cutting tool 1 from the workpiece 101.

More specifically, first, as illustrated in FIG. 20, the workpiece 101 is rotated in a D1 direction about an axis D. The cutting tool 1 is brought relatively close to the workpiece 101 by moving the cutting tool 1 in a D2 direction. Then, as illustrated in FIG. 21, the cutting edge 54 of the cutting tool 1 is brought into contact with the workpiece 101 to cut the workpiece 101.

At this time, the workpiece 101 is cut, with the cutting tool 1 being moved in a D3 direction, whereby the outer diameter machining can be performed. Then, as illustrated in FIG. 22, the cutting tool 1 is relatively moved away from the workpiece 101 by moving the cutting tool 1 in a D4 direction.

In FIG. 20, the cutting tool 1 is brought close to the workpiece 101 in a state where the axis D is fixed and the workpiece 101 is rotating. In FIG. 21, the workpiece 101 is cut by bringing the cutting edge 54 of the insert 5 into contact with the workpiece 101 that is rotating. In FIG. 22, the cutting tool 1 is moved away from the workpiece 101 that is rotating.

In the machining in the manufacturing method of the embodiment, the contact between the cutting tool 1 and the workpiece 101 is achieved by moving the cutting tool 1. Separation of the cutting tool 1 from the workpiece 101 is achieved by moving the cutting tool 1. However, naturally, the manufacturing method of the embodiment is not limited to such a configuration.

For example, in step (1), the workpiece 101 may be moved toward the cutting tool 1. In step (3), the workpiece 101 may be moved away from the cutting tool 1. In a case in which machining is to be continued, steps of bringing the insert into contact with different locations on the workpiece 101 may be repeated while the rotating state of the cutting tool 1 is maintained.

Here, representative examples of the material of the workpiece 101 include carbon steel, alloy steel, stainless steel, cast iron, and non-ferrous metals.

In the present disclosure, the invention has been described above based on the various drawings and examples. However, the invention according to the present disclosure is not limited to each embodiment described above. That is, the embodiments of the invention according to the present disclosure can be modified in various ways within the scope illustrated in the present disclosure, and embodiments obtained by appropriately combining the technical means disclosed in different embodiments are also included in the technical scope of the invention according to the present disclosure. In other words, note that a person skilled in the art can easily make various variations or modifications based on the present disclosure. Note that these variations or modifications are included within the scope of the present disclosure.

REFERENCE SIGNS

1 Cutting tool
3 Holder
5 Insert (cutting insert)
7 First screw
9 Second screw
51 Upper surface
52 Lower surface
53 Lateral surface
531 First lateral surface
532 Second lateral surface
54 Cutting edge
55 Through hole
56 First corner
57 First side
58 Second side
59 Second corner
60 Third side
61 Fourth side
62 First region
63 Second region
64 Recessed portion
65 First section
66 Second section
67 Breaker wall surface
68 Front end portion
69 Rear end portion
70 First portion
71 Second portion
72 Third portion
73 Fourth portion
101 Workpiece
103 Machined product
L1 Axis

The invention claimed is:

1. A cutting insert, comprising:

an upper surface comprising
a first corner having a protruding curve shape, and
a first side and a second side extending from the first corner;

a lower surface located on an opposite side to the upper surface;

lateral surfaces located between the upper surface and the lower surface;

a cutting edge located on the first corner and the first side; and a through hole that opens in the upper surface and the lower surface, wherein the lateral surfaces comprise:
a first lateral surface extending from the first side to the lower surface; and
a second lateral surface extending from the second side to the lower surface, in a front view of the upper surface, a virtual straight line passing through a front end of the first corner and extending in a major axis direction of the upper surface is referred to as an axis, the first lateral surface comprises:
a first region that has a recessed shape recessed toward the axis; and
a second region that is flat and is located farther from the first corner than the first region, the upper surface further comprises a recessed portion that is located between the second side and the axis and is recessed toward the axis in the front view of the upper surface, an entirety of the recessed portion is located farther from the first corner than an entirety of the first region in a direction along the axis, and the second lateral surface has a shape asymmetrical to that of the first lateral surface with respect to the axis.

2. The cutting insert according to claim 1, wherein the first side comprises:

a first section having a recessed shape located along the first region; and a second section having a linear shape located along the second region, the upper surface further comprises a breaker wall surface that is located between the first section and the axis, the breaker wall surface having a portion farther from the first section with increasing distance from the lower surface, the recessed portion comprises a front end portion that is closest to the first corner in the direction along the axis, the breaker wall surface comprises a rear end portion that is farthest from the first corner in the direction along the axis, and the rear end portion is located farther from the first corner than the front end portion in the direction along the axis.

3. The cutting insert according to claim 1, wherein the first side comprises:

a first section having a recessed shape located along the first region; and a second section having a linear shape located along the second region, and the first section comprises, in the front view of the upper surface:

a first portion having a linear shape connected to the first corner;

a second portion having a protruding curve shape connected to the second section; and a third portion having a recessed curve shape located between the first portion and the second portion.

4. The cutting insert according to claim 3, wherein in the front view of the upper surface, a radius of curvature of the first corner having the protruding curve shape is defined as a first radius of curvature, a radius of curvature of the second portion having the protruding curve shape is defined as a second radius of curvature, and a radius of curvature of the third portion having the recessed curve shape is defined as a third radius of curvature, and the first radius of curvature is larger than the second radius of curvature, and the third radius of curvature is larger than the first radius of curvature.

5. The cutting insert according to claim 3, wherein the first section further comprises a fourth portion having a linear shape located between the second portion and the third portion, and in the front view of the upper surface, an inclination angle of the first portion with respect to the axis is smaller than an inclination angle of the second side with respect to the axis, an inclination angle of the fourth portion with respect to the axis is larger than the inclination angle of the second side with respect to the axis, and an inclination angle of the second section with respect to the axis is identical to the inclination angle of the second side with respect to the axis.

6. The cutting insert according to claim 5, wherein the first portion is longer than the fourth portion.

7. A cutting tool comprising:

a holder that has a rod shape extending from a first end to a second end, and comprises a pocket located at the first end;

the cutting insert described in claim 1 located in the pocket;

a first screw inserted in the through hole and fixed to the holder; and a second screw that is brought into contact with the recessed portion and is fixed to the holder.

8. A method for manufacturing a machined product, the method comprising:

rotating a workpiece;

bringing the cutting tool described in claim 7 into contact with the workpiece that is rotating; and separating the cutting tool from the workpiece.

9. A cutting insert, comprising:

an upper surface comprising a first corner having a protruding curve shape, and a first side and a second side extending from the first corner;

a lower surface located on an opposite side to the upper surface;

lateral surfaces located between the upper surface and the lower surface;

a cutting edge located on the first corner and the first side; and a through hole that opens in the upper surface and the lower surface, wherein the lateral surfaces comprise:

a first lateral surface extending from the first side to the lower surface; and a second lateral surface extending from the second side to the lower surface, in a front view of the upper surface, a virtual straight line passing through a front end of the first corner and extending in a major axis direction of the upper surface is referred to as an axis, the first lateral surface comprises:

a first region that has a recessed shape recessed toward the axis; and a second region that is flat and is located farther from the first corner than the first region, the upper surface further comprises a recessed portion that is located between the second side and the axis and is recessed toward the axis in the front view of the upper surface, an entirety of the recessed portion is located farther from the first corner than an entirety of the first region in a direction along the axis, the first side comprises:

a first section having a recessed shape located along the first region; and a second section having a linear shape located along the second region, the first section comprises, in the front view of the upper surface:

a first portion having a linear shape connected to the first corner;

a second portion having a protruding curve shape connected to the second section; and a third portion having a recessed curve shape located between the first portion and the second portion, in the front view of the upper surface, a radius of curvature of the first corner having the protruding curve shape is defined as a first radius of curvature, a radius of curvature of the second portion having the protruding curve shape is defined as a second radius of curvature, and a radius of curvature of the third portion having the recessed curve shape is defined as a third radius of curvature, and the first radius of curvature is larger than the second radius of curvature, and the third radius of curvature is larger than the first radius of curvature.

10. A cutting insert, comprising:

an upper surface comprising a first corner having a protruding curve shape, and a first side and a second side extending from the first corner;

a lower surface located on an opposite side to the upper surface;

lateral surfaces located between the upper surface and the lower surface;

a cutting edge located on the first corner and the first side; and a through hole that opens in the upper surface and the lower surface, wherein the lateral surfaces comprise:

a first lateral surface extending from the first side to the lower surface; and a second lateral surface extending from the second side to the lower surface, in a front view of the upper surface, a virtual straight line passing through a front end of the first corner and extending in a major axis direction of the upper surface is referred to as an axis, the first lateral surface comprises:

a first region that has a recessed shape recessed toward the axis; and a second region that is flat and is located farther from the first corner than the first region, the upper surface further comprises a recessed portion that is located between the second side and the axis and is recessed toward the axis in the front view of the upper surface, an entirety of the recessed portion is located farther from the first corner than an entirety of the first region in a direction along the axis, the first side comprises:

a first section having a recessed shape located along the first region; and a second section having a linear shape located along the second region, the first section comprises, in the front view of the upper surface:

a first portion having a linear shape connected to the first corner;

a second portion having a protruding curve shape connected to the second section; and a third portion having a recessed curve shape located between the first portion and the second portion, the first section further comprises a fourth portion having a linear shape located between the second portion and the third portion, and in the front view of the upper surface, an inclination angle of the first portion with respect to the axis is smaller than an inclination angle of the second side with respect to the axis, an inclination angle of the fourth portion with respect to the axis is larger than the inclination angle of the second side with respect to the axis, and an inclination angle of the second section with respect to the axis is identical to the inclination angle of the second side with respect to the axis.

* * * * *